Jan. 26, 1960  J. SZYDLOWSKI  2,922,278
COAXIAL COMBUSTION PRODUCTS GENERATOR AND TURBINE
Filed Oct. 19, 1953  7 Sheets-Sheet 2

INVENTOR.
Joseph Szydlowski,
BY
Wenderoth, Lind & Ponack
attys.

Fig. 3.

Jan. 26, 1960 J. SZYDLOWSKI 2,922,278
COAXIAL COMBUSTION PRODUCTS GENERATOR AND TURBINE
Filed Oct. 19, 1953 7 Sheets-Sheet 5

Fig. 5.

INVENTOR.
Joseph Szydlowski,
BY
Wenderoth, Lind & Ponack
attys.

United States Patent Office 2,922,278
Patented Jan. 26, 1960

2,922,278

COAXIAL COMBUSTION PRODUCTS GENERATOR AND TURBINE

Joseph Szydlowski, Usine Turbomeca, Bordes, France

Application October 19, 1953, Serial No. 386,761

Claims priority, application France November 30, 1948

4 Claims. (Cl. 60—39.36)

This application is a continuation-in-part of application Serial No. 126,143, filed November 8, 1949, now abandoned.

This invention has for its object improvements in plants incorporating propelling groups provided with gas turbines and more particularly those that form turbo-propelling groups or reaction-jet propeller groups.

The main object of my invention consists in designing a propelling group incorporating a compressed gas turbine of a reduced bulk and the mounting and dismantling of which are very easy. To this end, the group is contained in a series of juxtaposed aligned casings containing respectively a speed reducer, a compressor, a combustion chamber and a turbine. This arrangement of casings is provided with a series of axial bearings for a central revoluble shaft to which are keyed the blades of the compressor and the blades of the turbine. The revoluble shaft is hollow and serves as an admission channel for the fuel. The casing of the speed reducer is in its turn connected with a casing containing the auxiliaries, namely a fuel pump, a lubricating oil pump and a regulator controlling the output of fuel.

A further object of the invention consists in providing in the propelling group of the character described the highest possible reduction of the maximum cross section area by constraining the moving fluid to follow a path constituted solely by annular tracks, without any sharp turns therein.

A further object is to provide a construction wherein the air compressor and the turbines are arranged coaxially and the combustion chamber has an annular shape of the type described in my copending application Serial No. 126,141, filed November 8, 1949, now abandoned, entitled: "Combustion Chamber With Diverse Combustion and Diluent Air Paths." The combustion chamber comprises an outer casing, a combustion chamber having an intake radial part acting simultaneously as combustion space, a medial axial part acting as mixing space and an axial outlet part directed towards the turbine. The combustion chamber is housed within the casing and has an annular space connected with the air compressor. An axially rotating hollow member formed with radial passages opens into said combustion space and is connected with a fuel feeding apparatus for dividing the flow of compressed air circulating through said annular space into three different streams, the first one penetrating axially within said combustion space at low speed near said radial passages, the second one penetrating within said combustion space relatively radially from said radial passages, and the third one penetrating substantially axially within said mixing space and means for cooling the burnt gases escaping through said axial outlet together with means for burning fuel in the air in said combustion chamber.

A further object is to provide an arrangement including a compressor, a combustion chamber and a turbine which may be used with a suitable speed reducing device as a complete turbo-propelling group, the reducing gear controlling, on one hand, the auxiliary parts above-mentioned and, on the other hand, a shaft coaxial with the turbine shaft from which power may be transmitted. Furthermore, the system referred to may form, after changing the turbine and the speed reducing casing, a reaction jet turbine group. In this latter case, the speed reducer gear controls a shaft in the system of auxiliary parts, the casing of which is arranged axially with reference to the turbine and is located centrally of the compressor air intake which compressor is in the case considered of a simple axial type. The shape of the gas delivering output nozzles is obviously designed in accordance with the application contemplated.

A further object is to provide means for improvements relating to the suspension means for the rear turbine bearing and for a labyrinthic bearing carrying the input end of the hollow shaft in the combustion chamber, the suspension being provided in the manner disclosed in my copending application Serial No. 126,142, filed November 8, 1949, now abandoned, and entitled: "Arrangement for Securing Bearings or Similar Members to an Expansible Casing," such an arrangement comprising a plurality of similar connecting members regularly distributed round the shaft axis and having a length greater than the width of the annular interval existing between the casing and the bearing, and two series of spindles parallel to the shaft axis and located annularly at regular intervals round said axis respectively on the bearing and on the casing. The number of spindles in each series is equal to that of the connecting members and the bearing and the casing are pivotally secured through the spindles to the corresponding connecting members. The spindles on the casing are then respectively equally deviated with respect to the radii passing through the spindles on the bearing. Furthermore, the rear bearing of the turbine is submitted to ventilation. The introduction of fuel into the combustion chamber is performed by means of a rotary distributor and the fluid-tightness at this point with reference to the shaft is provided through a double labyrinthic bearing between the elements of which compressed air from the output of the compressor is fed.

According to a further object of the invention, the lubrication of the different elements of the reducing gear and of the bearings for the revoluble shaft is provided either under pressure or through fuel fed drop by drop by gauged jets.

The following description made with reference to accompanying drawings and given solely by way of exemplification and by no means in a limiting sense will allow the invention to be properly understood together with various advantageous features thereof. In said drawings.

Similar reference characters indicate like parts in the various figures.

Figure 1:
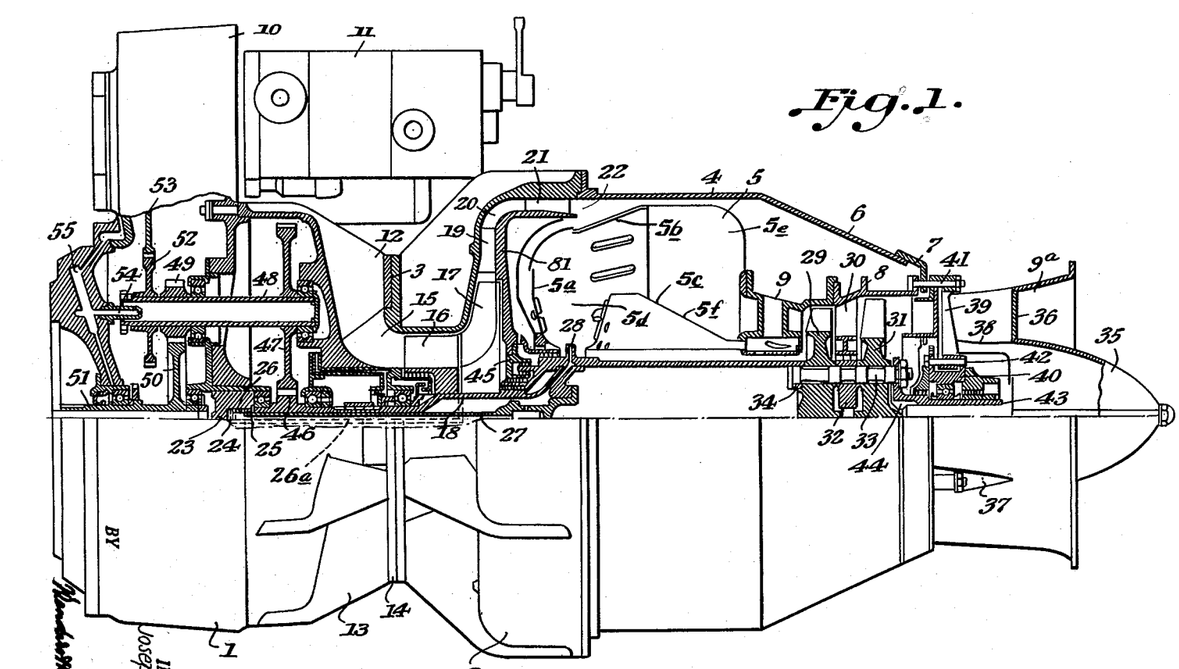
Figure 1 is a side view partly sectional of a turbo-propelling group incorporating a combustion gas turbine.

The gas turbine group of Fig. 1 includes a speed reducing gear casing 1 to which is juxtaposed the compressor casing 2 with the interposition of shouldered bearing surfaces 3. To the casing 2 is associated in adjacent relationship and also with the interposition of a shouldered bearing surface a further casing 4 containing a combustion chamber 5 of the type described in my abovementioned copending application Serial No. 126,141 filed November 8, 1949, now abandoned, and having a front, an outer and an inner wall, 5a, 5b, 5c, respectively defining a front combustion space 5d of annular form and a rear axially disposed annular passage 5e communicating with the outer portion of said combustion space 5d and formed with an outlet passage 5f adjacent to said inner wall 5c. The rear end of the casing 4 includes a truncated conical part 6 the smaller base of which serves for the securing of a ring 7 comprising an annular portion forming a shoulder and carrying the turbine casing 8 projecting inside the truncated cone 6.

The casing 8 is associated in juxtaposed relationship with an axial diffuser formed by the hollow blades of the turbine inlet nozzle 9 at the outlet passage 5f of the combustion chamber 5 through its upstream edge while the downstream edge of said turbine casing is juxtaposed to the exhaust means 9a to be described hereinafter.

The casing 1 includes a lateral projection 10 that serves for its connection with a casing 11 containing the auxiliaries, such as a starter, a fuel pump, an oil pump and a fuel feed regulator and the casing 11 also carries the means adjusting the fuel supply to a value selected by the operator, according to circumstances. This adjustment of the output is ensured by means of an arrangement described in my copending application Serial No. 126,144 filed November 8, 1949, now abandoned and entitled: "Improvements in the Feeding of Gas Turbines," said arrangement being such that the output of fuel delivered by a pump under a pressure of a few atmospheres is adjusted as a function of the desired rate of running or of the load of the turbine through the action of a speed regulator, the speed of operation of which is adjustable, on the pressure prevailing in a by-pass channel fed by said pump, located on the upstream side of the regulator and including an adjustable valve providing a more regular flow in said by-pass.

The downstream end of the casing 1 includes a series of channels 12 constituted by the passages existing between the fins 13 rigid with said casing 1 and connecting it with the centering ring 14 through which the casing 2 is secured. The radial fins 13 guide the incoming stream of air sucked in by the compressor and the fins 13 are distributed regularly around the axis of the group to register with a modifying element constituted by a right angular duct 15 and defined by an annular bent channel forming the final axial input into the compressor.

The compressor contained in the casing 2 includes an axial wheel 16 followed by a radial wheel 17. The wheels are keyed to the hollow central shaft 18.

The radial output of the wheel 17 feeds a stream of air into the stationary blade distributor 19 that is followed by a right angled annular passage 20 that returns the stream into parallelism with the shaft. The passage 20 having a peripheral axially directed output is provided with a second blade distributor 21 on the upstream side of the annular passage 22 through which the stream of air enters the casing 4. As clearly apparent from Figure 1, the path followed by such stream of air assumes substantially an S-shape without showing any turning back curvatures. The securing of the different casings together is obtained through large shouldered bearing surfaces so as to cooperate in making the mounting easier and giving the whole system a greater rigidity.

The fuel is delivered through a pipe, which is not illustrated, from the casing 11 into a distributor 23 engaged by a projection 24 on the hollow shaft 18. Fluid-tightness is ensured in register with such rotary distributor through a double labyrinthic bearing 25 whose elements are separated by a gap 26. Into the gap 26, there opens a pipe 26a feeding compressed air, the opening of said pipe lying in register with the output of the compressor wheel 16, 17 acting as a fan whereby compressed air is introduced into the gap 26 substantially at the pressure prevailing at the output of the pipe feeding fuel into the combustion chamber, i.e. at a pressure slightly greater than that applied to the fuel in said shaft, as described hereinafter, so as to simultaneously prevent any leak of fuel towards the inside of the casing 1 and any leak of air towards the inside of the hollow shaft 18.

The hollow shaft 18 is provided with an inner sleeve 27 feeding the fuel to the jets 28 rotating with the shaft and delivering fuel radially into the combustion chamber 5.

The diffuser 9 which is similar to that described in my copending application Serial No. 126,141 filed November 8, 1949, now abandoned, entitled: "Combustion Chamber With Diverse Combustion and Diluent Air Paths," directs through the intervals between its hollow blades the jet of gases to the first wheel 29 of the turbine which is followed by a stationary stream guiding system 30 fixed to the casing 8 and which is followed in turn by a turbine wheel 31. The wheels 29 and 31 are separated by a ring 32 and are held by the bolted keys 33 whose heads enter perforations in a ring 34 forming the downstream end of the hollow shaft 18. The outline of the wheels is designed in a manner so that the turbine may act as a reaction wheel. The annular gaseous stream escaping from the turbine is sent to the exhaust inside the exhaust casing 9a through the space between the latter casing and a shield or core 35 of generally conical form held axially of the casing 9a by means of hollow stays 36.

The outer ends of the hollow stays 36 open through ports 37 in the casing wall while their inner ends open at 38 into the wall of the hollow core 35. The hollow stays contain links 39 serving for the suspension of the support 40 for the bearing of the stub shaft 43 forming the rear extension of the turbine shaft. These links are pivotally secured at their outer ends to the spindles 41 serving for the securing of the casing 8 to the ring 7 and at their inner ends to the spindles 42 fitted on the bearing support 40.

The bore in the stub shaft 43 that is revolubly secured inside the bearing extends throughout the length of said stub shaft and the shaft 43 is bolted by a flange thereon to the keys 33 in order to define with the rear surface of the turbine a passage communicating with the exhaust space by the nuts fastening the keys 33. The hollow stub-shaft 43 is provided on its flange with blades 44 acting as a fan projecting the air, sucked in through the ports 37 and through the stays 36 into the core 35, inside the exhaust stream of burnt gases. Consequently the rear bearing for the stub shaft 43 is considerably cooled together with the stays holding the exhaust means, the stub shaft itself, the support 40 and the rear surface of the turbine. The thermic behaviour of this assembly is therefore held easily under control.

On the upstream side of the turbine, the shaft 18 includes a double labyrinthic member 45. The suspension means for the support of the rear bearing at 40 and of the labyrinthic bearing are executed in conformity with my copending application Serial No. 126,142 filed November 8, 1949, now abandoned, and entitled: "Arrangement for Securing Bearings or Similar Members to an Expansible Casing."

The hollow shaft is carried by a system of ball bearings that are all lubricated under pressure through the agency of suitable pipes fed by the oil pump contained in the casing 11 with the other auxiliary parts. The upstream end of the shaft 18 carries a gear 46 meshing with one or more intermediate pinions 47 that are regularly distributed around the gear 46. Each pinion 47 is fixed to a hollow shaft 48 parallel with the shaft 18 and revolubly mounted in ball bearings contained in the casing 1. To the front thereof, the shaft 48 carries a pinion 49 meshing with a gear 50 fixed to a shaft 51 from which power may be derived and which is aligned with the main shaft 18.

Furthermore, the shaft 48 carries a pinion 52 meshing with a gear 53 which drives the auxiliary parts. The teeth of the pinions 52, 49 and 47 and also the bearings of the shaft 48 may be lubricated through the agency of the central bore in the shaft 48 that receives through an axial jet 54 a measured amount of lubricating oil taken off the circuit 55 of compressed oil. Said lubricating oil is distributed to said teeth and bearings under the action of the centrifugal force through radial ducts provided in shaft 48 and pinions 52, 49 and 47, said ducts being not shown for the sake of clarity.

The operation of the turbine group thus described is obvious and it is not necessary to describe it in further detail.

Figures 2, 9:
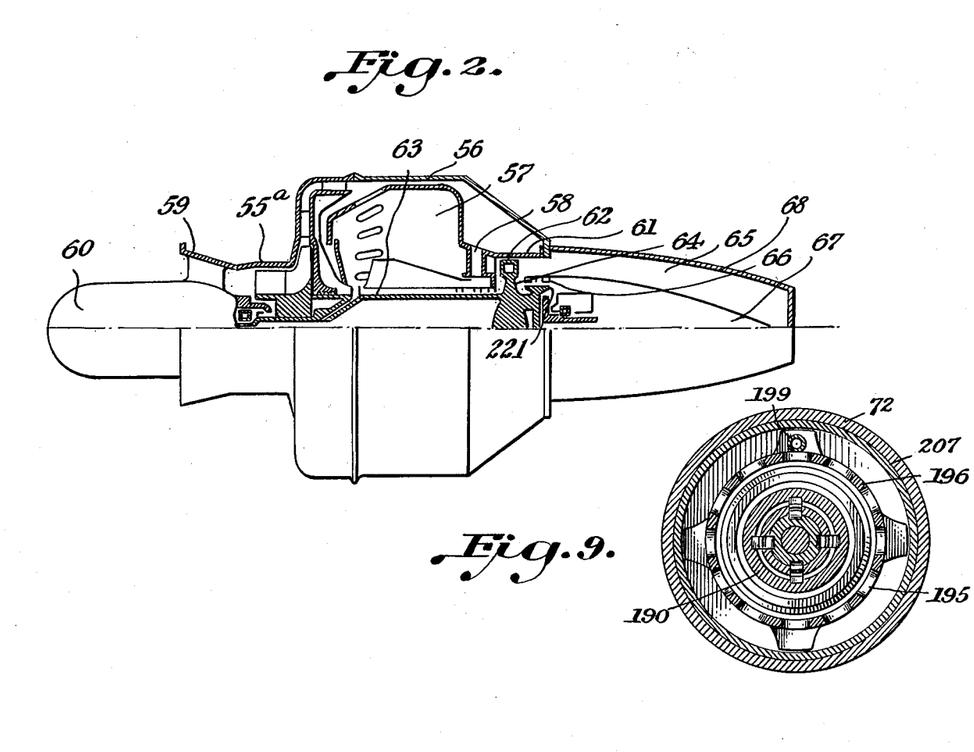
Figure 2 is a diagrammatic view of a modification of Figure 1, showing in side view partly sectional a reaction jet turbine group.
Figure 9 is a cross-sectional view of Fig. 3 taken along the line IX—IX through the front bearing.

The casings, at least as far as the compressor casing and the combustion chamber are concerned, may be adapted to the constitution of a reaction jet turbine group that is diagrammatically illustrated in partial cross section in Figure 2. This group includes a compressor casing 55a adjacent to a casing 56 for the combustion chamber 57 which chamber includes a hollow diffuser 58 for the burnt gases. The axial input of the compressor casing 55a includes an input nozzle 59 lying co-axially of a dome 60 containing the auxiliaries. These auxiliaries include a starter, a fuel pump, an oil pump and a regulator for the fuel output. The casings 55a and 56 and the turbine casing 61 are mounted in the same manner as the corresponding parts described with reference to Figure 1.

The casing 61 of the turbine is connected with the casing 56 and the diffuser 58 but it contains only one turbine wheel 62 fixed to a hollow central shaft 63. The rear surface 64 of the turbine wheel faces the gaseous ejection stream 65 while fluid-tightness is ensured rearwardly thereof through a cylindrical drum-like part 221 formed on an extension of the driving shaft at the rear of said turbine and cooperating labyrinthic bearings 66, whereby the forward thrust of the compressor is balanced by the rearward thrust of the turbine to which is added the difference between the thrusts exerted by the exhaust gas pressure on the front surface of drum 221 and by the atmospheric pressure on the rear surface of said drum 221. The gaseous stream 65 flows between a central shield 67 or core of generally conical form and an outer wall or ejection casing 68 also of generally conical form as in all reaction jet turbines of the type considered. The other arrangements remain the same as those described precedingly.

The modified construction shown in Figures 3 to 9 inclusive shows a compressor casing 72 containing an impeller type air compressor 73 for feeding compressed air into the combustion chamber 74. A hollow diffuser 75 is provided at the outlet of the combustion chamber for the exhaust gases.

Figure 3:
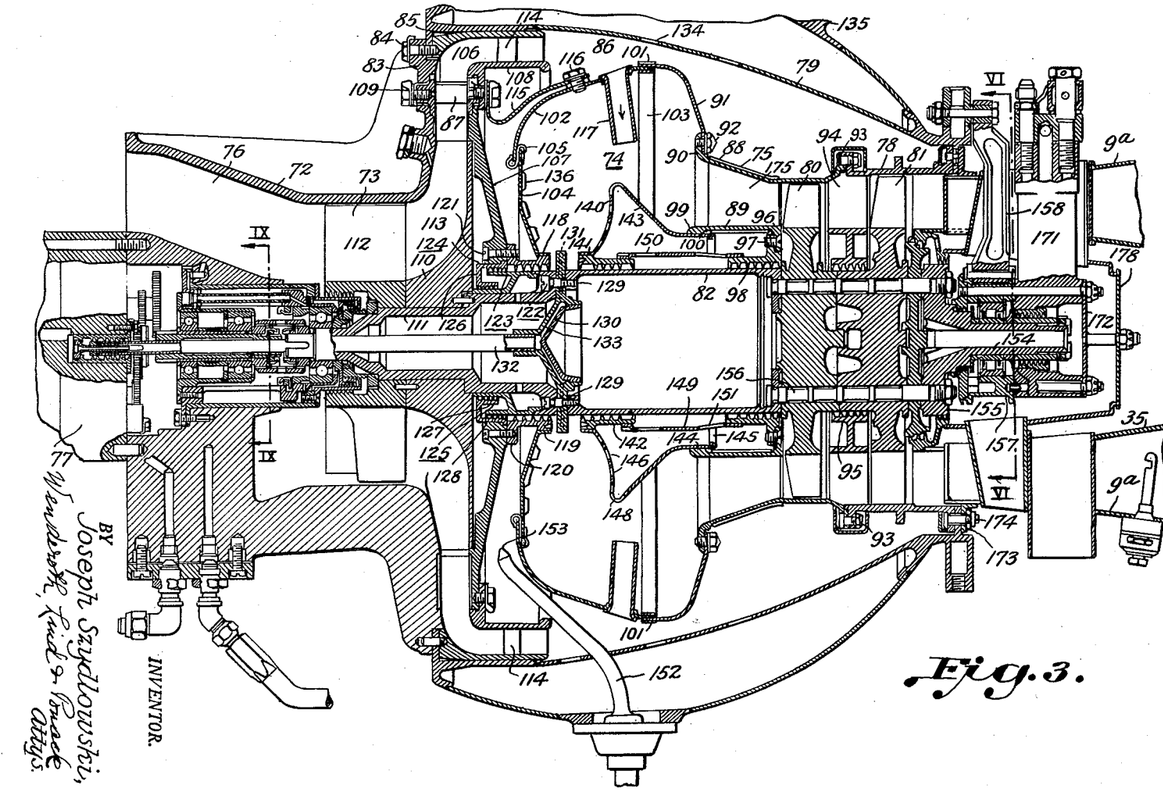
Figure 3 is an enlarged axial sectional view of a modified construction showing particularly the front bearing, the compressor section, the combustion section, the turbine section, and the rear bearing section of the engine.

The axial annular input nozzle for the compressor 73 is indicated at 76 and the casing wherein the various auxiliary elements are located such as a starter, fuel pump, oil pump and a regulator for the fuel delivery is shown at 77.

The turbine casing 78 is connected with the combustion chamber double walled casing 79 at 173 by the bolts 174. The turbine casing 78 is also connected to the hollow diffuser 75. Turbine wheels 80 and 81 are fixed to the hollow central shaft 82. The rear terminal surfaces of the turbine wheels 80 and 81 face the gaseous output stream and fluid tight means are mounted towards the rear forming a bearing and a labyrinthic system.

The combustion chamber 74 is located within the casing 79 surrounding the rotary shaft 82 and differs in various features from the combustion chamber shown in Figures 1 and 2.

The compressor casing 72 is provided with a radially outwardly directed flange 83 to which the double walled casing 79 is secured by the bolts 84. The bolts 84 also secure in position an annular flange member 85 which directs the air coming from the compressor 73 from a radial direction to an axial direction into the passage 86 located between the inner surface of the casing 79 and the combustion chamber. The annular passage 106 communicating with the passage 86 is provided with a diffuser 87 for the compressed air.

The diffuser 75 is fixed to the casing 79 through the casing 78 for the turbine wheels and this diffuser is of the same construction as shown in Figures 1 and 2 at 9 and 58.

The diffuser 75 is provided with hollow blades 175 which are held between the two cylindrical coaxial walls 88 and 89 which are also fixed to the casing 79 through the casing 78. The hollow blades 175 define channels or passages lying between said blades for the passage therethrough of the compressed air coming from the passage 86 to the annular space within the inner wall 140, 142 of the combustion chamber.

The inlet of the outer wall 88 of diffuser 75 has an outer flange 90 which is bolted by the bolts 92 to the shell 91 defining a portion of the combustion chamber.

The outlet end of the wall 88 is provided with a flange which is in turn secured to a flange provided upon the inlet end of the turbine casing 78 and such flanges are secured together by the bolts 93. A diffuser 94 is provided between the turbine wheels 80 and 81 and is provided with a labyrinthic sleeve 95 bearing upon the rotating hubs of the wheels 80 and 81. The inner wall 89 is provided with an inwardly radially directed flange 96 which is secured by the bolts 97 to the labyrinthic bearing 98. At its inlet end the wall 89 is provided with a reinforcement 99 having a sliding contact surface 100 extending coaxially with the shaft 82.

The forward edge of the shell 91 is reinforced by a ring 101. Making sliding contact with such forward edge is an intermediate annular shell member 102 which has its rearward edge reinforced by the ring 103 at the point where the shell 102 makes sliding contact with the shell 91. A forward shell 104 extending radially inwardly, is flexibly connected to the shell 102 by means of the flexible clips 105.

Located in front of the shells 102 and 104 is the cover assembly comprising the plate 107 and the ring 108 secured to the plate 107 by the bolts 109 which also secure the diffuser 87 in place and define a portion of the inner surface of the annular passage 106.

The impeller 73 comprises the hub portion 110 which is secured to the hollow shaft 111 which in turn is fixed to the hollow shaft 82 and is of reduced diameter. The impeller 73 comprises the axially extending portion of the vanes 112 and the vanes 113 extending axially at the inlet and then extending radially outwardly towards the passage 106. A further diffuser 114 is located in the axially extending portion of the passage 106.

In order to further support the intermediate shell 102 in position and allow for expansion and contraction thereof such shell is supported by the flexible brackets 115 to which it is secured by means of the bolts 116. The forward ends of the flexible brackets are secured to the ring 108 by means of the bolts 109. Generally five of such brackets 115 disposed about the circumference of the shell 102 are sufficient.

The intermediate shell 102 is also provided with a series of cooling tubes 117 having their inlets adjacent the passage 86 and their outlets located substantially medially of the inner and outer annular walls of the outlet portion of the combustion chamber. Approximately twenty of such cooling tubes are located at spaced intervals around the circumference of the intermediate shell 102.

At the inner periphery of the shell 104 there is provided an axially extending flange 118 which is fixed in any desired manner to the labyrinthic ring 119 contacting an extension 122 provided upon the shaft 111. The ring 119 is provided at its forward portion with a flange 120 secured fixedly to the cover plate 107 by the bolts 121. The labyrinthic ring 119 also is in contact with a ring 123 which is fixed to the shaft 111. The outer periphery of the ring 123 is located at the same distance from the center as the outer periphery of the rotating shaft 82. The ring 123 is provided with two radially spaced surfaces 124 and 125. Fixed to the inner periphery of the plate 107 is a ring 126 provided with two labyrinthic rings 127 and 128 which contact the surfaces 124 and 125 respectively of the ring 123.

The hollow shaft 111 is bolted to the hollow shaft 82 by means of the bolts 129 which extend through an outwardly directed flange upon the rear end of the shaft 111 and an inwardly directed flange upon the front end of the shaft 82. In between the flanges upon the shafts 111 and 82 there is clamped the slinger type fuel injector 130 which is also secured by means of the bolts 129. The slinger 130 is provided with the outlet bores 131 which are fed from the fuel line 132 feeding the passages 133 leading to the bores 131.

The wall of the casing 79 is shown as being provided with bleed apertures 134 and the power plant with an outer cover with a flanged air outlet 135, for adapting the plant for use as an air compressor.

The shell 104 is provided with a series of tangential ports 136 which extend in three concentric circles and open tangentially in opposite directions so as to increase the whirl of air as fed to the combustion space through these ports. The ports 136 are preset and are spaced radially so as to make the temperature of the exhaust gases substantially uniform throughout the exhaust gas outlet. The presetting of the ports controls the center of combustion in the combustion chamber.

A shell 140 constitutes the inner wall of the combustion chamber and is provided with a flange 141 at its front end fixed to the labyrinthic ring 142 contacting the shaft 82. The wall 140 extends radially outwardly from the ring 142 and is concave or dish-shaped towards the combustion space. It is then bent backwardly as shown particularly in Figure 3 and extends radially inwardly at an inclination to form the portion 143 and is then again bent so as to extend axially at the portion 144. The rearward edge of the portion 144 is reinforced by a bent over portion or a ring 145 where it slidingly contacts the contact surface 100 upon the reinforcement 99 of the inner wall 89 of the diffuser 75.

The concave or dish-shaped portion of the inner wall 140 is provided with a series of ports or apertures 146 as shown in Figure 3 which may be of various sizes. The ports 146 are arranged in four circles although this number of circles may be diminished or increased as desired. Also the apertures or ports 146 are formed in the inner wall 140 normal to the surface thereof so that air coming through said holes is focused to some extent or rather directed in a converging direction into the combustion space to supply air at the point of greatest combustion.

The surface 143 of the inner wall 140 is provided with apertures at spaced intervals in a single line adjacent the most radial outward point of the wall and these apertures are connected by slots 148 with certain apertures 146 provided upon the concave portion of the inner wall. Fixed to the rearward end of the labyrinthic ring 142 and to the front end of the labyrinthic ring 98 is a sleeve 149 which at its forward end has two rows of holes 150 of approximately 16 holes each and which are disposed in staggered relation. At the rearward end of the sleeve 149 a single row of holes 151 is provided which are slightly larger in diameter than the forward holes. These holes are preferably 16 in number.

An igniter 152 is mounted in the casing 79 and extends inwardly as shown in Figure 3 to a point in front of the tangential ports provided in the front wall 104 of the combustion chamber so as to ignite and shoot a flame through such partition in order to ignite the combustible mixture in the combustion chamber. The igniter is connected to a separate fuel feed and carries a sparking device 153. The sparking device 153 is connected to an electrical ignition circuit. The igniter constitutes a unitary assembly which is located as above stated.

The entire assembly of the compressor, turbine and combustion chamber as outlined above lends itself extremely well to a streamlined construction and also results in an extremely compact compressor turbine. Further such an assembly permits an easy dismantling of the hollow shaft and elements associated therewith as well as an easy replacement of the fuel slinger whilst the machining of said slinger made in a member of reduced bulk is rendered less expensive.

In members which are submitted to high thermic strains there are important expansions which when such members are made of different materials may reach different values. The phenomena arising therefrom are more marked in the case of thermic engines in which the kinetic energy and the pressure of the gases fed by the combustion chambers are used directly when very hot after being brought to a high temperature. A gas turbine when used directly as the source of the driving power or for feeding a reaction jet propeller has casings that are in contact with the gases at a very high temperature which are subjected to considerable variations in size because of their expansion and contraction.

In such case it is difficult to secure upon such casings members such as supports for bearings which will hold their position and alignment perfectly unvarying whatever may be the conditions of operation.

Figure 5:
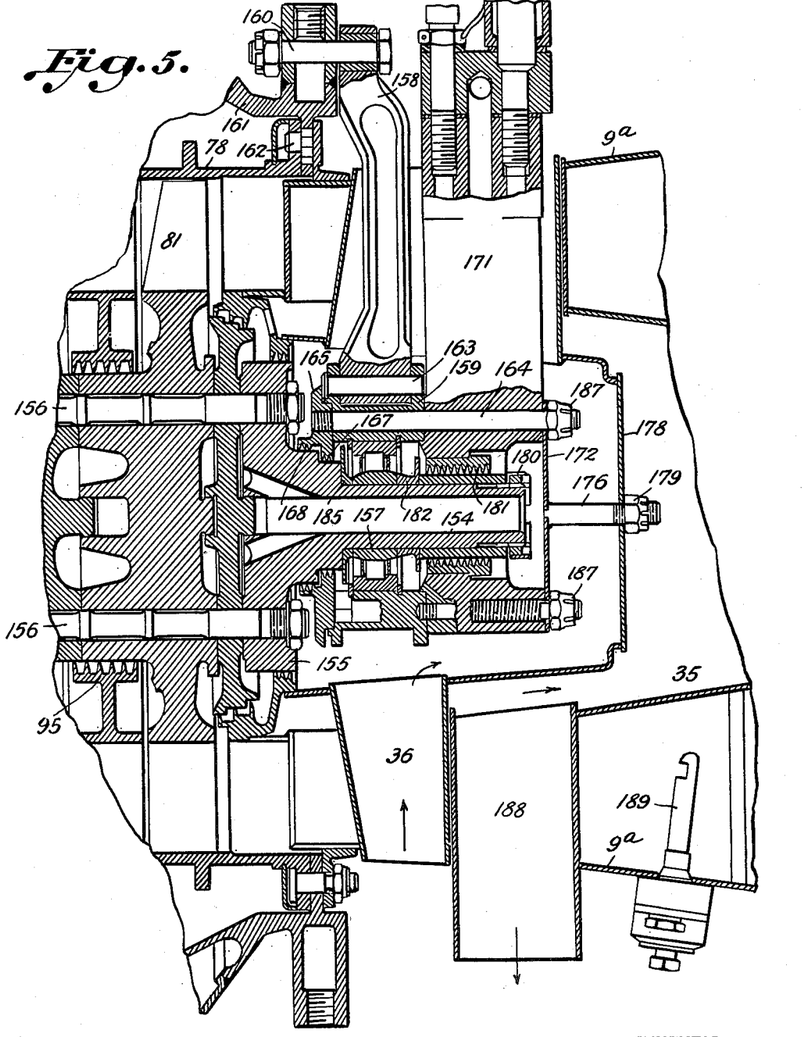
Figure 5 is a similar axial sectional view illustrating particularly the construction of the rear bearing and associated parts.

This is the situation with respect to the rear bearing 157 for the stub shaft 154 which is provided with a flange 155 which in turn is connected by the bolts 156 to the turbine wheels 80 and 81 and to the hollow shaft 82, see Figure 5.

The hollow stays 36 which are three in number contain the links 158 which carry the support 159 for the rear bearing 157 of the turbine shaft comprising the stub shaft 154, the hollow shaft 82 and the stub shaft 111. The outer ends of the links 158 are pivotally secured to the spindles 160 which are mounted upon the ring 161 at the tail end of the casing 79. The ring 161 serves to interconnect the casing 79 also with the casing 78 of the turbine wheels by means of the bolts 162. The inner ends of the links 158 are pivotally secured to the bearing support 159 by means of the spindles 163.

Figure 6:
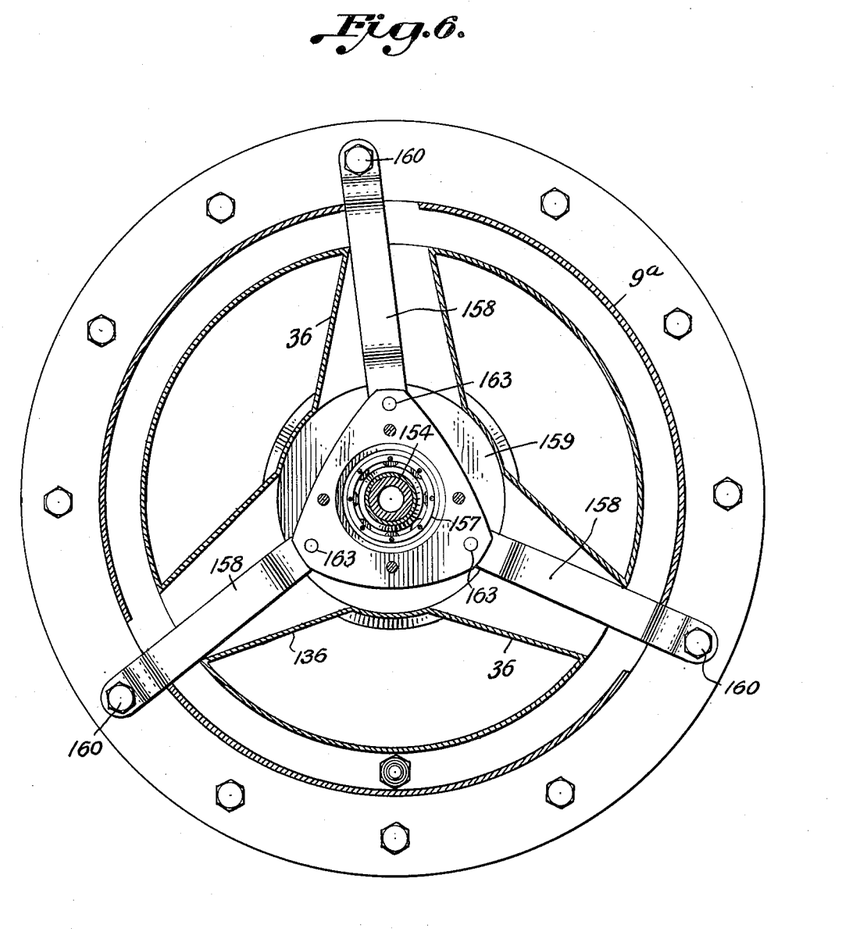
Figure 6 is a cross-sectional view of Fig. 3 along the line VI—VI showing the mounting for the rear bearing.
Figures 7, 8:
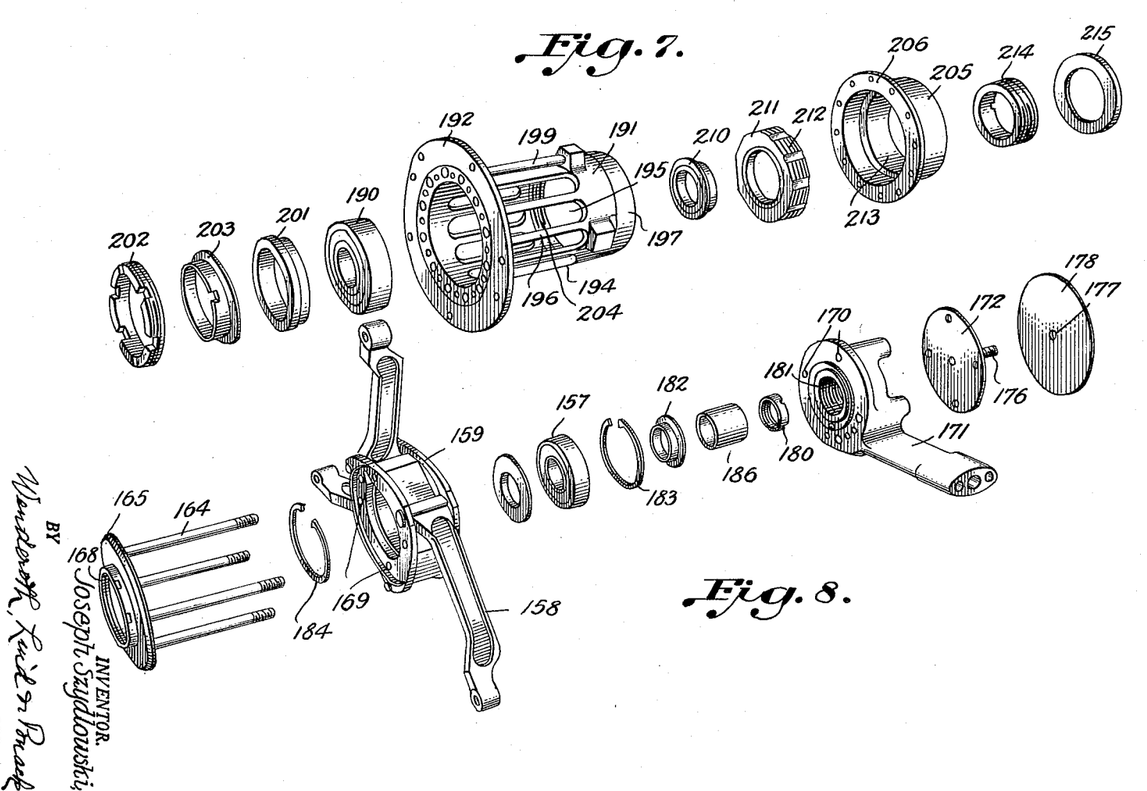
Figure 7 is an exploded view in perspective showing the component parts constituting the front bearing.
Figure 8 is a similar view of the components constituting the rear bearing.

The spindles 160 and 163 of each link 158 define a plane that is parallel with the axis of the bearing carried within the support 159 and such plane passes at a certain distance from such axis, see Figures 6 and 8. This distance is the same for the planes of all the links 158 and associated spindles. These planes define together with their meeting lines a regular polygonal prism, see Figure 6 with the axis thereof coinciding with the axis of the bearing 157. The links 158 extend through the openings 37 of the hollow stays 36.

When the turbine casing reaches a high temperature the distance separating the axis of the bearing from the pivotal spindles 160 varies. When the casing 78 expands the operation of the spindles 160 and 163 causes the planes defined by the spindles 160 and 163 to rock around the outer spindle 160 whereby all of such planes move by equal angles and come nearer to the axis of the bearing 157 carried inside the support 159. The axis of the bearing remains stationary and the bearing itself will simply rotate around its axis. When the turbine casing cools the reverse appears. The heating and cooling of the links 158 are all subjected to equal deformations that produce merely a relative rotation of the support with reference to the casing with said rotation always having for its axis the axis of the bearing. The arrangement permits retaining fluid tightness for the bearing without any risk of wear or of jamming.

Carried by the support 159 by means of the bolts 164 is a labyrinthic ring 165 having two labyrinthic surfaces 167 and 168 located at spaced distances radially from the axis of the shaft 154 and cooperating with stepped surfaces provided upon the shaft 154. The bolts 164 extend through the apertures 169 provided in the support 159 and through the apertures 170 provided in an oil distributing member 171 to the deflector plate 172 which has a threaded pintle 176 located at the center thereof which engages through the central hole 177 provided in the deflector plate 178. The plate 178 is secured in position by means of the lock nut 179. An exploded view of the various elements constituting the labyrinthic studding assembly together with the links 158 is shown in Figure 8. In such view in addition to the elements above mentioned there is shown a lock nut 180, the labyrinthic ring 181, the oil slinger 182, washers 183 and 184, a further oil slinger 185 and a spacing element 186. The entire assembly is assembled and held in position by means of the lock nuts 187 secured to the threaded ends of bolts 164. The oil distributing member 171 is connected with suitable oil feed lines under proper pressure. Cooling air for the rear assembly is supplied through the hollow stays 36 and circulates in the direction of the arrows and exits through the duct 188. A thermocouple 189 is provided within the casing 9a for registering the temperature.

The engine as described above has an operating range between 30,000 and 35,000 r.p.m. It also has two critical vibration periods with the first at about 32,000 r.p.m. and the second at about 42,000 r.p.m. A whipping of the shaft is therefore liable to occur since the operating range of the engine covers the first critical vibration period. In order to overcome this the front bearing of the engine is mounted in a cantilever construction which gives the requisite flexibility so as to bring the first critical vibration period from about 32,000 r.p.m. down to about 24,000 r.p.m. which brings such first critical vibration sufficiently below the operating range of the engine. The operation range of the engine will never reach the second critical vibration period.

Figure 4:
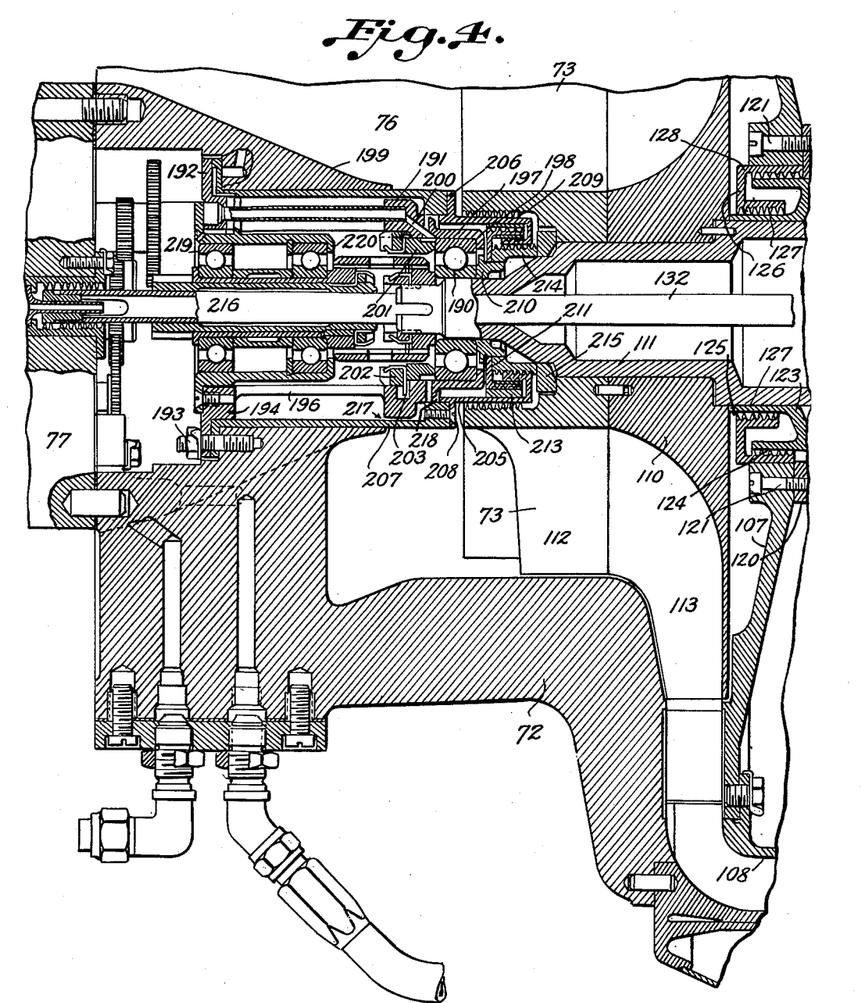
Figure 4 is an enlarged axial sectional view illustrating particularly the front bearing in the modification shown in Figure 3.

Referring to Figures 4 and 7 this special construction for supporting the front bearing 190 of the engine is a cage construction 191 which comprises a front plate 192 which is secured to the casing 72 by means of bolts 193. Secured to the plate 192 is the cylindrical cage member 194 having the elongated slots 195 therein which define flexible ribs 196. At the rear the cage 191 is reduced in diameter as shown at 197 and the rearward edge of the reduced portion is turned inwardly to form a flange 198. The bearing 190 is seated within the reduced portion 197 of the cage 191.

Thus the hollow shaft 111 may gyrate with respect to the compressor casing 72 in order to prevent, by the determination of the flexibility of ribs 196, any whipping of said hollow shaft by bringing out below the operating range of the jet power unit, between 30,000 and 35,000 r.p.m., any critical vibration period of said shaft which would be normally covered by said operating range, at about 32,000 r.p.m. for example.

Also associated with the cage construction is an oil tube 199 which is connected with the oil supply for feeding oil through the channel 200 to the bearing 190.

The forward end of the bearing 190 is retained in position against the flange 198 by the ring 201 which in turn is secured in position by the castellated ring nut 202 with the shim 203 interposed. The threaded nut 202 cooperates with the threads 204 provided upon the interior of the cage immediately in front of the reduced portion thereof.

A labyrinthine construction is provided rearwardly of the bearing 190 and comprises the ring 205 having a flange 206 which is bolted to a cylindrical member or liner 207 enclosing the cantilever mounting of the front bearing by the screws 208. The cylindrical member 207 is secured to the frame 72 by the bolts 193 which secure the cantilever mounting. An interior surface of the hub of the vanes 112 is provided with the labyrinthic sealing means 209 which cooperate with the exterior surface of the ring 205.

Abutting the rear end of the bearing 190 is a ring member 210 and mounted on the rearward reduced portion of the ring member 210 is a ring shaped member 211 having labyrinthic sealing means 212 on the outer surface thereof which cooperates with a surface 213 upon the inner surface of the member 205. The member 205 at its rearward end is provided with a flange directed forwardly of the engine and with this flange the labyrinthic seal 214 cooperates. A spacing member 215 abuts the member 214 at its rearward end and at its other side abuts a reduced portion upon the shaft 111.

The shaft 111 drives the shaft 216 for the auxiliary elements of the engine and for taking off power. The shaft 216 is mounted in the bearings 219 and 220.

A clearance of .020 to .030 is provided between the cantilever housing and the cantilever mounting at the points 217 and 218. This clearance is generally sufficient to allow gyration and the clearance at the point 218 may be less than that provided at the point 217.

Oil is supplied to the various locations under pressure as desired and the labyrinthic sealing means utilized provide proper sealing.

The shaft construction extending through the engine comprises the rear stub shaft 154 which is bolted to the turbine wheels and to the rear wall of the large hollow intermediate shaft 82. Then the shaft construction is again reduced in diameter by the front stub shaft 111. The fuel slinger 130 is clamped between the front shaft 111 and the intermediate shaft 82 while the turbine wheels 80 and 81 are clamped between the rear shaft 154 and the intermediate shaft 82. Such a shaft construction is eminently suitable for undergoing the temperature changes taking place in the engine.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. In a jet power unit having, in alignment, an air compressor, a combustion chamber and a turbine rotor, a driving shaft mechanically connecting said compressor and said turbine rotor, two stationary casings connected to each other and respectively housing said compressor and the assembly comprising said combustion chamber and turbine rotor, and a stationary exhaust casing with an inlet connected to the outlet of the combustion chamber and turbine rotor casing, a hollow stationary core of generally conical form being arranged coaxially inside the exhaust casing for defining an annular exhaust space, and hollow radial stays connecting said core with said exhaust casing, the outer ends of said stays opening to the atmosphere with their inner ends opening in the wall of the hollow core; the improvement comprising a hollow rear stub shaft forming the rear part of the driving shaft, extending into the hollow stationary core and secured on the rear surface of the turbine rotor at a distance therefrom for defining with said surface a passage which communicates with the annular exhaust space, said stub shaft being inwardly provided near said passage with a series of fan blades, a rear bearing supporting said rear stub shaft, a support carrying said rear bearing, and means for connecting said support with the combustion chamber and turbine rotor casing; whereby atmospheric air sucked in into the hollow stays into the hollow core is directed by the fan blades of the hollow stub shaft out of the core through said passage into the flow of exhaust gases for simultaneously cooling by a single flow of air said hollow stays, said rear stub shaft, said rear bearing, said support and the rear surface of the turbine rotor.

2. In a jet power unit having, in alignment, an air compressor, a combustion chamber and a turbine rotor, a driving shaft mechanically connecting said compressor and said turbine rotor, two stationary casings connected to each other and respectively housing said compressor and the assembly comprising said combustion chamber and turbine rotor, and a stationary exhaust casing with an inlet connected to the outlet of the combustion chamber and turbine rotor casing; the improvement comprising means for countering the difference between the thrust of the compressor and that of the turbine rotor, said means comprising a cylindrical drum-like part formed on an extension of the driving shaft rearwardly of the rear surface of the turbine rotor and having a front and a rear surface, a stationary shield of generally conical form housed inside the exhaust casing and defining therewith an annular exhaust space, the front edge of greatest diameter of said shield registering with the front part of said drum-like part, and a labyrinthic member carried by the front part of said shield and applied against said drum-like part, whereby the forward thrust of the compressor is balanced by the rearward thrust of the turbine rotor to which is added the difference of the thrusts exerted by the exhaust gases on the front surface of said drum-like part and by the atmospheric pressure on the rear surface of said drum-like part.

3. In a jet power unit having, in alignment, an air compressor, a combustion chamber and a turbine rotor, a driving shaft mechanically connecting said compressor and said turbine rotor, and two stationary casings connected to each other and respectively housing said compressor and the assembly comprising said combustion chamber and turbine rotor; the improvement comprising a rear bearing for the driving shaft connected with the combustion chamber and turbine rotor casing, a front bearing for said shaft, and a cage having a front portion secured to the compressor casing, an intermediate portion having elongated slots therein defining flexible ribs and a rear portion within which said front bearing is seated, thereby permitting the shaft to gyrate with respect to the compressor casing in order to prevent, by the determination of the flexibility of said ribs, any whipping of said shaft by removing from the operating range of the jet power unit any critical vibration period of said shaft which would be normally covered by said operating range.

4. In a jet power unit having, in alignment, an air compressor, a combustion chamber and a turbine rotor, a driving shaft mechanically connecting said compressor and said turbine rotor, two stationary casings connected to each other and respectively housing said compressor and the assembly comprising said combustion chamber and turbine rotor, and a stationary exhaust casing with an inlet connected to the outlet of the combustion chamber and turbine rotor casing, a hollow stationary core of generally conical form being arranged coaxially inside the exhaust casing for defining an annular exhaust space, and hollow radial stays connecting said core with said exhaust casing, the outer ends of said stays opening to the atmosphere with their inner ends opening in the wall of the hollow core; the improvement comprising means for simultaneously cooling the rear part of the driving shaft adjacent to the turbine rotor, the rear bearing of said shaft and the rear surface of said turbine rotor, said means comprising a hollow rear stub shaft forming the rear part of the driving shaft, extending into the hollow stationary core and secured on the rear surface of the turbine rotor at a distance therefrom for defining with said surface a passage which communicates with the annular exhaust space, said stub shaft being inwardly provided near said passage with a series of fan blades, a rear bearing supporting said rear stub shaft, a support carrying said rear bearing, and means for connecting said support with the combustion chamber and turbine rotor casing; means for balancing the difference in thrust between the compressor and the turbine rotor, said means comprising a cylindrical bearing surface formed on an extension of said rear stub shaft, the front edge of the hollow stationary core registering with the front part of said bearing surface, and a labyrinthic member carried by the front part of said core and applied against said bearing surface; and means for removing the critical vibration period of said shaft from the range of operating speeds of the jet power unit, said means comprising a front bearing for said driving shaft, and a cage having a front portion secured to the compressor casing, an intermediate portion having elongated slots therein defining flexible ribs and a rear portion within which said front bearing is seated, in order to permit the driving shaft to gyrate with respect to the compressor casing, thereby simultaneously obtaining by said three means a decrease in weight and bulk for said driving shaft and an increase of its endurance and operating life.

References Cited in the file of this patent

UNITED STATES PATENTS

| | | |
|---|---|---|
| 1,003,321 | Belluzzo | Sept. 12, 1911 |
| 2,119,990 | Hilton | June 7, 1938 |
| 2,149,728 | Cronan | Mar. 7, 1939 |
| 2,214,568 | Thomas | Sept. 10, 1940 |
| 2,244,467 | Lysholm | June 3, 1941 |
| 2,360,130 | Heppner | Oct. 10, 1944 |
| 2,399,865 | Halford | May 7, 1946 |
| 2,419,669 | Birmann | Apr. 29, 1947 |
| 2,434,134 | Whittle | Jan. 6, 1948 |
| 2,445,114 | Halford | July 13, 1948 |
| 2,469,439 | Lundquist | May 10, 1949 |
| 2,487,842 | Whiteman et al. | Nov. 15, 1949 |
| 2,538,179 | Weinhardt | Jan. 16, 1951 |
| 2,545,916 | Clark | Mar. 20, 1951 |
| 2,557,747 | Judson et al. | June 19, 1951 |
| 2,564,218 | Walker et al. | Aug. 14, 1951 |
| 2,568,921 | Kroon | Sept. 25, 1951 |
| 2,576,762 | Lawter | Nov. 27, 1951 |
| 2,611,532 | Ljungstrom | Sept. 23, 1952 |
| 2,614,386 | McLeod et al. | Oct. 21, 1952 |
| 2,620,624 | Wislicenus | Dec. 9, 1952 |
| 2,620,626 | Lysholm | Dec. 9, 1952 |
| 2,625,794 | Williams | Jan. 20, 1953 |
| 2,628,766 | Rydmark et al. | Feb. 17, 1953 |
| 2,635,420 | Jonker | Apr. 21, 1953 |
| 2,650,753 | Howard | Sept. 1, 1953 |
| 2,655,307 | Buckland | Oct. 13, 1953 |
| 2,692,724 | McLeod | Oct. 26, 1954 |
| 2,698,772 | Roberts | Jan. 4, 1955 |
| 2,724,621 | Kenny | Nov. 22, 1955 |
| 2,856,755 | Szydlowski | Oct. 21, 1958 |

FOREIGN PATENTS

| | | |
|---|---|---|
| 882,330 | France | Feb. 22, 1943 |
| 585,337 | Great Britain | Feb. 5, 1947 |